(12) United States Patent
Milde, Jr.

(10) Patent No.: US 7,568,657 B2
(45) Date of Patent: Aug. 4, 2009

(54) VTOL PERSONAL AIRCRAFT

(76) Inventor: Karl F. Milde, Jr., 752 Union Valley Rd., Mahopac, NY (US) 10541

( * ) Notice: Subject to any disclaimer, the term of this patent is extended or adjusted under 35 U.S.C. 154(b) by 652 days.

(21) Appl. No.: 11/326,016

(22) Filed: Jan. 5, 2006

(65) Prior Publication Data

US 2006/0202083 A1   Sep. 14, 2006

Related U.S. Application Data

(60) Provisional application No. 60/661,554, filed on Mar. 14, 2005.

(51) Int. Cl.
*B64C 9/00* (2006.01)
(52) U.S. Cl. .......................... 244/55; 244/201
(58) Field of Classification Search ................ 244/201, 244/12.6, 55, 70, 62, 53 R
See application file for complete search history.

(56) References Cited

U.S. PATENT DOCUMENTS

| | | | | |
|---|---|---|---|---|
| 1,533,713 A | * | 4/1925 | Tatay | 244/9 |
| 3,868,073 A | * | 2/1975 | King | 244/34 A |
| 3,971,534 A | * | 7/1976 | Grotz | 244/207 |
| 4,804,155 A | * | 2/1989 | Strumbos | 244/12.6 |
| 6,607,162 B2 | * | 8/2003 | Warsop et al. | 244/12.6 |

* cited by examiner

*Primary Examiner*—Timothy D Collins
(74) *Attorney, Agent, or Firm*—Milde & Hoffberg, LLP

(57) ABSTRACT

A vertical take-off and landing (VTOL) aircraft comprises (1) a fuselage having a front end, a rear end and two lateral sides, the fuselage defining a substantially horizontal central longitudinal axis of the aircraft; (2) an aircraft tail arranged at the rear end of the fuselage and including a rudder and an elevator on each side of the fuselage with movable surfaces for controlling the aircraft; and (3) a wing on each side of the fuselage having a front edge, a trailing edge and an upper surface extending from the front edge to the trailing edge. According to the invention, means are provided for increasing the speed of an airstream flowing over the upper surface of each wing, and an air deflector is disposed on each side of the fuselage between the trailing edge of each wing and the aircraft tail. These deflectors each have a deflection surface to deflect downward the airstream flowing over the upper surface of the wing to act as a "brake" to the forward motion of the aircraft and to provide additional lift so that the aircraft may hover.

13 Claims, 9 Drawing Sheets

VTOL PERSONAL AIRCRAFT

CROSS REFERENCE TO RELATED APPLICATION

This application is related to and claims priority from U.S. patent application Ser. No. 11/229,157, filed Sep. 16, 2005, entitled "VTOL PERSONAL AIRCRAFT", which, in turn, is a continuation-in-part of U.S. patent application Ser. No. 11/114,836, filed Apr. 26, 2005, entitled "VTOL PERSONAL AIRCRAFT", which, in turn, is a continuation-in-part of U.S. patent application Ser. No. 10/242,036, filed Sep. 11, 2002, now U.S. Pat. No. 6,886,776. This application also claims priority from U.S. Provisional Patent Application Ser. No. 60/661,554, filed Mar. 14, 2005.

BACKGROUND OF THE INVENTION

This application relates to a vertical take-off and landing (VTOL) aircraft designed to carry a pilot and just a small number (e.g., less than ten) of passengers. Such an aircraft may be denominated a "PERSONAL AIRCRAFT".

The present invention further relates to a VTOL Personal Aircraft of the conventional type; that is, an aircraft having a central, longitudinally extending fuselage; an aircraft tail, including a rudder and elevator arranged at the rear end of the fuselage, for controlling the aircraft; and at least one wing arranged on each side of the fuselage for providing lift, due to the different speeds of the airstreams flowing over the upper surface and the lower surface, respectively, of the wing.

The present invention is also specifically related to a VTOL Personal Aircraft of the conventional type, described above, which includes some means for increasing the speed of the airstream flowing over the upper surface of each wing. Such an increase in the speed of the airstream results in increased lift due to the well-known Bernoulli's Principle.

Various means and devices have been developed in the art for increasing the speed of the air that flows over the upper surface of an aircraft wing. Once such device is disclosed in the U.S. patent application Ser. No. 11/229,157, referred to above. Another such means and device was developed by Willard R. Custer over a period of many years, culminating in an FAA-certified aircraft known as the "CCW-5 Custer Channel Wing Aircraft". Elements of the design of the Custer Channel Wing Aircraft are disclosed in the following U.S. patents, the contents of which are incorporated herein by reference:

U.S. Pat. No. 2,437,684
U.S. Pat. No. 2,510,959
U.S. Pat. No. 2,532,482
U.S. Pat. No. 2,611,555
U.S. Pat. No. 2,691,494
U.S. Pat. No. 3,123,321
U.S. Pat. No. 3,705,700

Aircraft of the aforementioned type operate well as short take-off and landing (STOL) aircraft. However, such aircraft have difficulty hovering and operating in a VTOL mode unless facing into a relatively strong wind and/or operated at a high angle of attack into the wind. This is clearly unsatisfactory for an aircraft which is intended to make frequent vertical take-offs and landings.

SUMMARY OF THE INVENTION

It is therefore an object of the present invention to provide a VTOL Personal Aircraft of the type described above which includes means for increasing the speed of the air flowing over the upper surface of each wing, which can hover and can reliably execute vertical take-offs and landings.

This object, as well as further objects which will become apparent from the discussion that follows, are achieved, in accordance with the present invention, by providing an air deflector, disposed on each side of the fuselage between the rear edge of each wing and the aircraft tail which has a deflection surface to deflect downward the airstream received from the upper surface of the wing.

The air deflector according to the invention thus operates in a manner similar to the "air brake" utilized on commercial jet aircraft. As in the case of the air brake, the air deflector is inserted into the airstream and applies two forces to the aircraft:

(1) a braking force against the forward movement of the aircraft; and (2) a lifting force in reaction to the downward deflection of the airstream.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
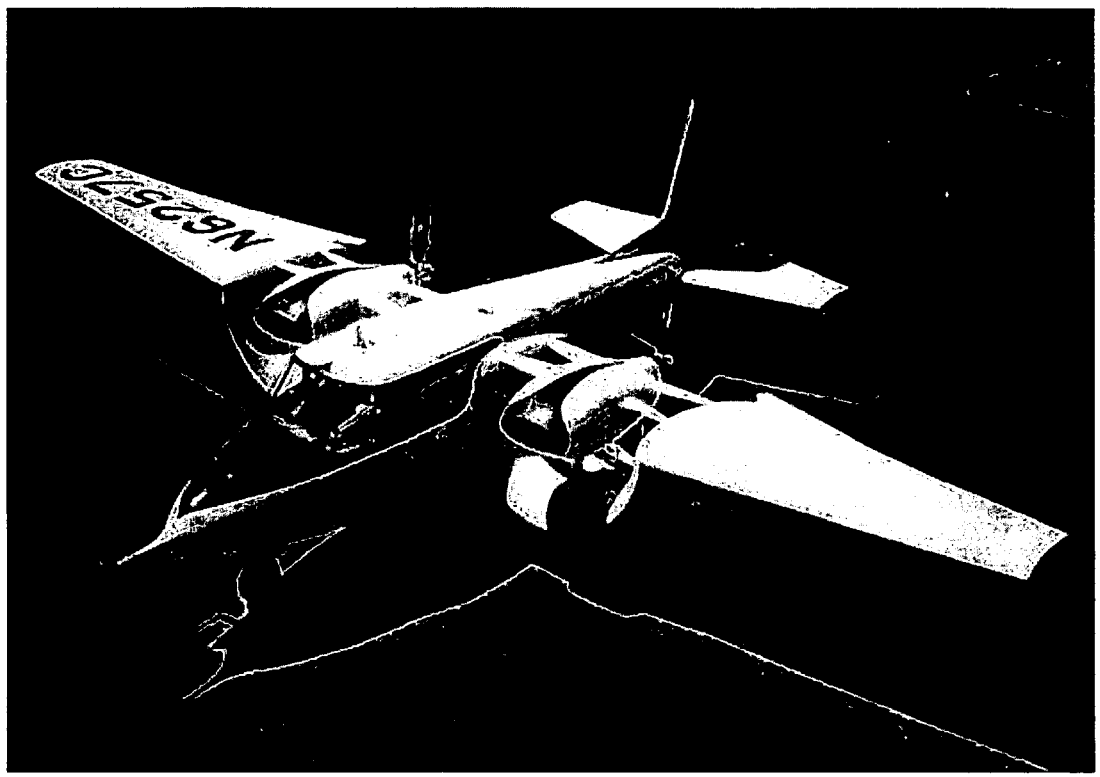
FIG. 1 is a perspective view of the CCW-5 Custer Channel Wing aircraft.

The preferred embodiments of the present invention will now be described with reference to FIGS. 1-16 of the drawings. Identical elements in the various figures are designated with the same reference numerals.

FIGS. 1-6 illustrate the well known Custer Channel Wing aircraft, as disclosed in the Custer patents, referred to above, and in the literature. Since these figures illustrate the well-known prior art, no further discussion thereof is believed to be necessary.

Figure 7:
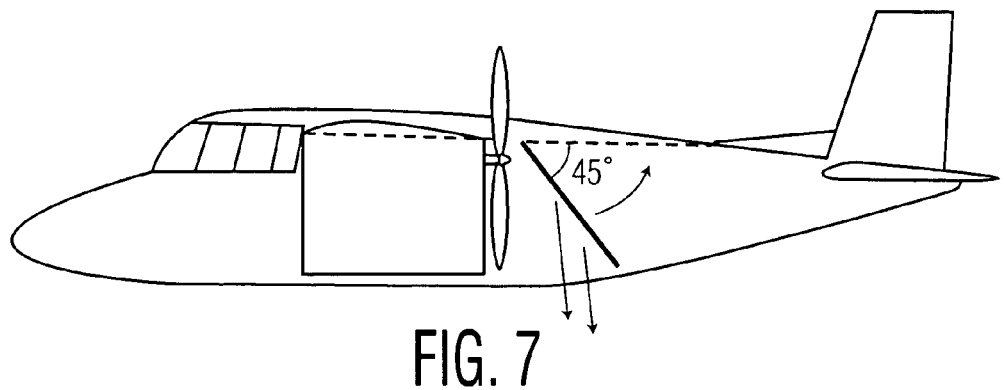
FIG. 7 is a side view of the aircraft of FIGS. 1-3 incorporating a linear deflector panel according to a first preferred embodiment of the present invention, which may be swiveled into and out of the airstream.
Figure 8:
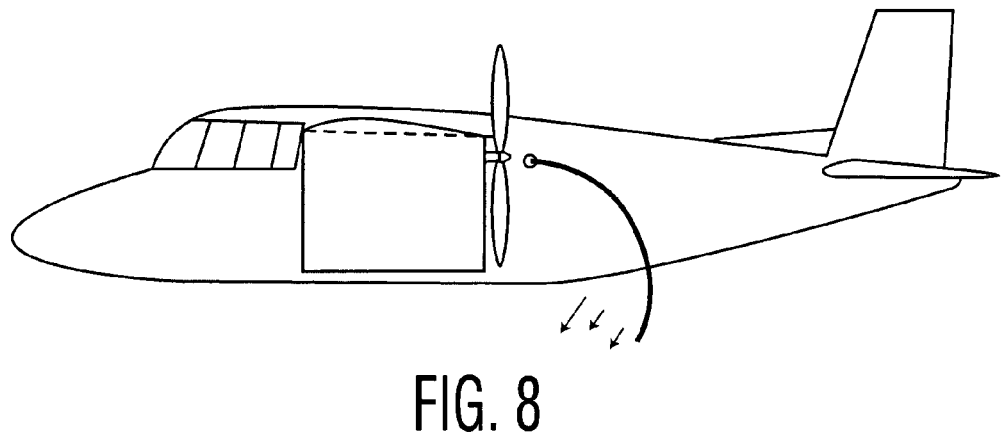
FIG. 8 is a side view of the aircraft of FIGS. 1-3 incorporating a curved deflector panel according to a second preferred embodiment of the present invention.
Figure 9:
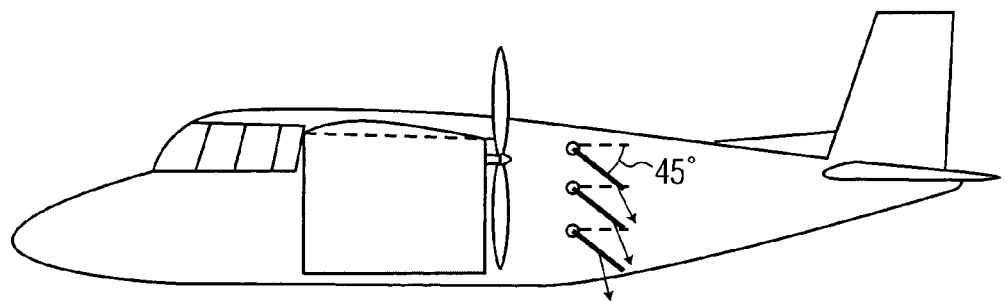
FIG. 9 is a side view of the aircraft of FIGS. 1-3 incorporating a deflector comprising a plurality of parallel deflector panels, according to a third preferred embodiment of the present invention.

FIGS. 7, 8 and 9 illustrate, respectively, three different preferred embodiments of an air deflector according to the present invention for deflecting downward the airstream flowing over the upper surface of the wing. In FIG. 7, a single deflector panel is disposed on each side of the fuselage between the rear edge of each wing and the aircraft tail. This panel is hinged at the top so that it may be moved between the active position shown, at an angle of approximately 45° with respect to the horizontal, and a retracted position in which the panel is substantially horizontal. In the active position shown in FIG. 7, the deflector deflects the airstream downward and, at the same time, serves as a "brake" to slow the forward movement of the aircraft. In the retracted position, in which the panel is horizontal, this panel has substantially no effect on the performance of the aircraft.

FIG. 8 shows a second preferred embodiment having a panel with a concave deflection surface. This embodiment is capable of directing the air forward as well as downward, as indicated by the arrows, thus increasing the braking effect and enabling the aircraft to hover, stationary in the air.

FIG. 9 shows a modification of the embodiment of FIG. 7 wherein a plurality of deflector panels are provided in parallel. These panels are movable together between the active position, at an angle of about 45° with respect to the horizontal, and a retracted position in which all the panels are aligned horizontally.

Figure 2:
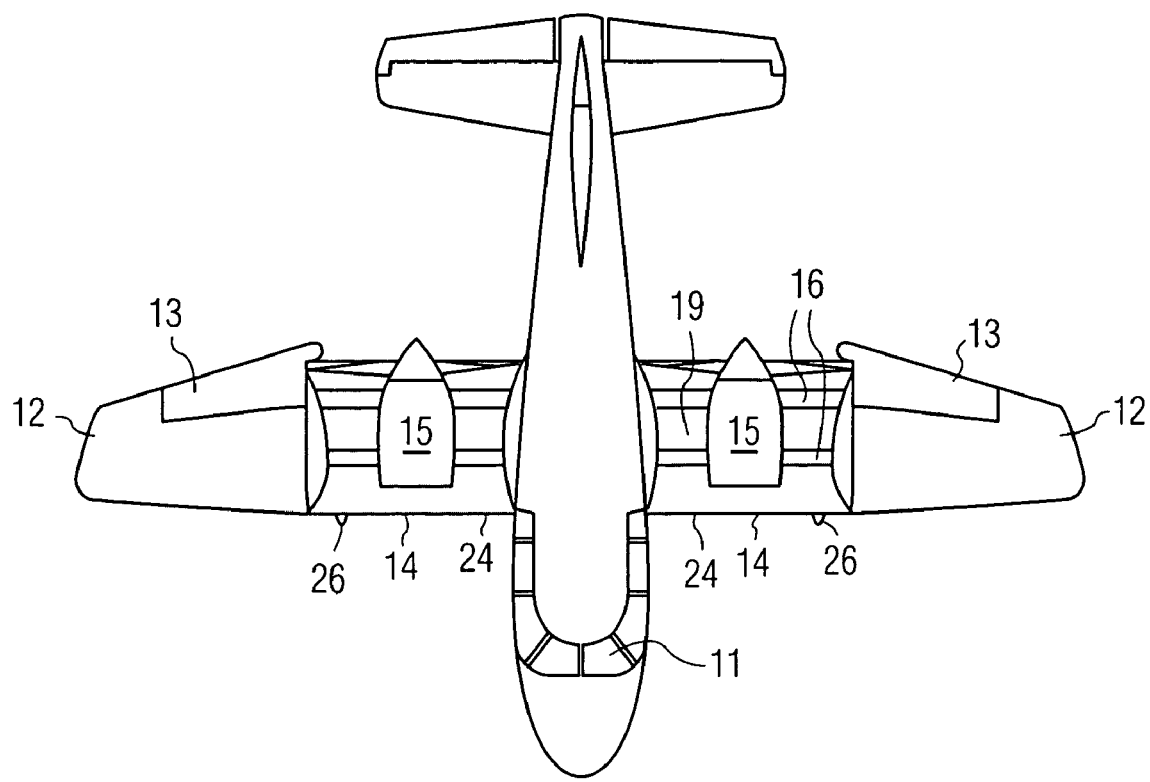
FIG. 2 is a top view of the aircraft shown in FIG. 1 as illustrated and described in the U.S. Pat. No. 3,705,700.
Figure 3:
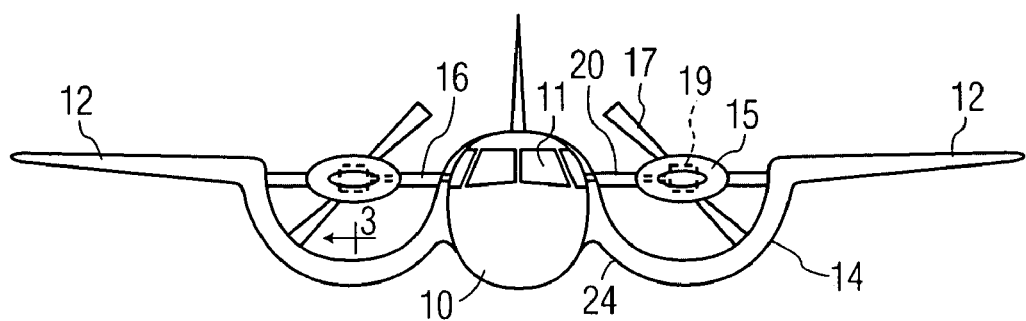
FIG. 3 is a front view of the aircraft shown in FIGS. 1 and 2 as illustrated and described in the aforementioned U.S. Pat. No. 3,705,700.
Figure 4:
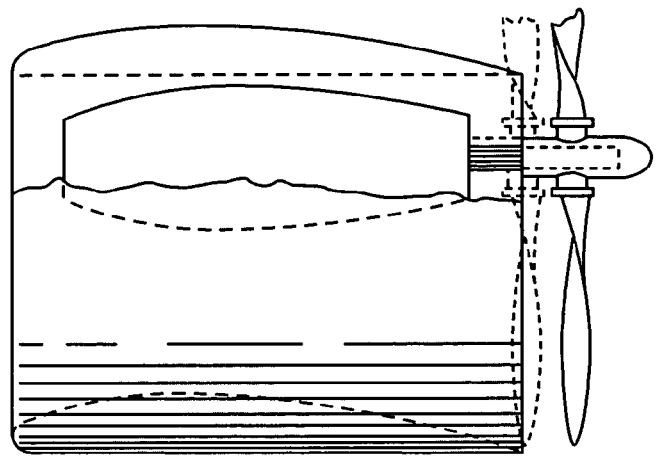
FIG. 4 is a cutaway, elevational view of a portion of the aircraft of FIG. 1 showing an improvement in Channel Wing aircraft, as illustrated and described in the U.S. Pat. No. 3,123,321.
Figure 5:
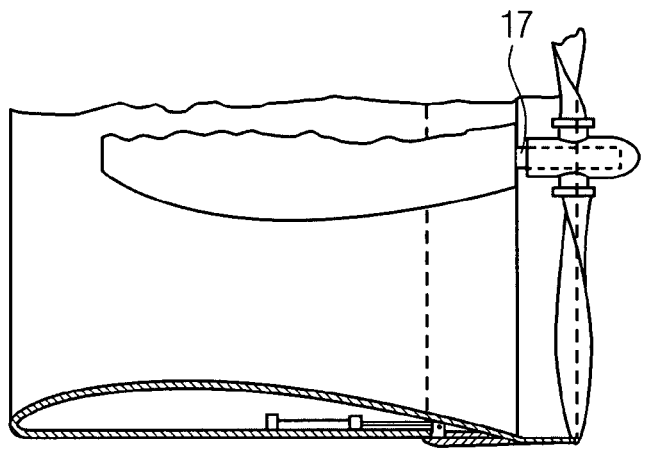
FIGS. 5 and 6 are detailed side elevational views, partly in cross-section, showing another improvement in Channel Wing aircraft, as illustrated and described in the aforementioned U.S. Pat. No. 3,123,321.
Figure 6:
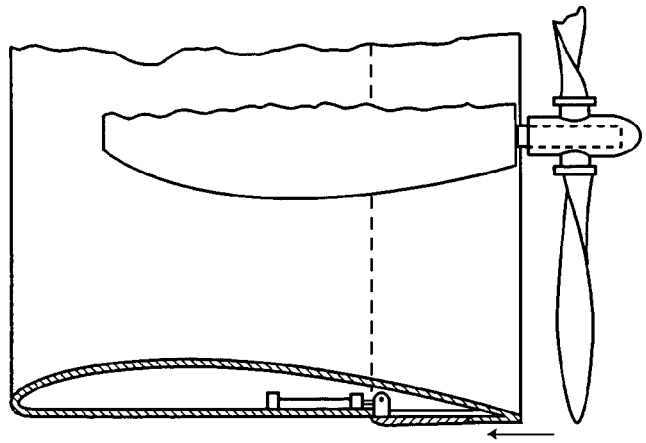
Figure 10:
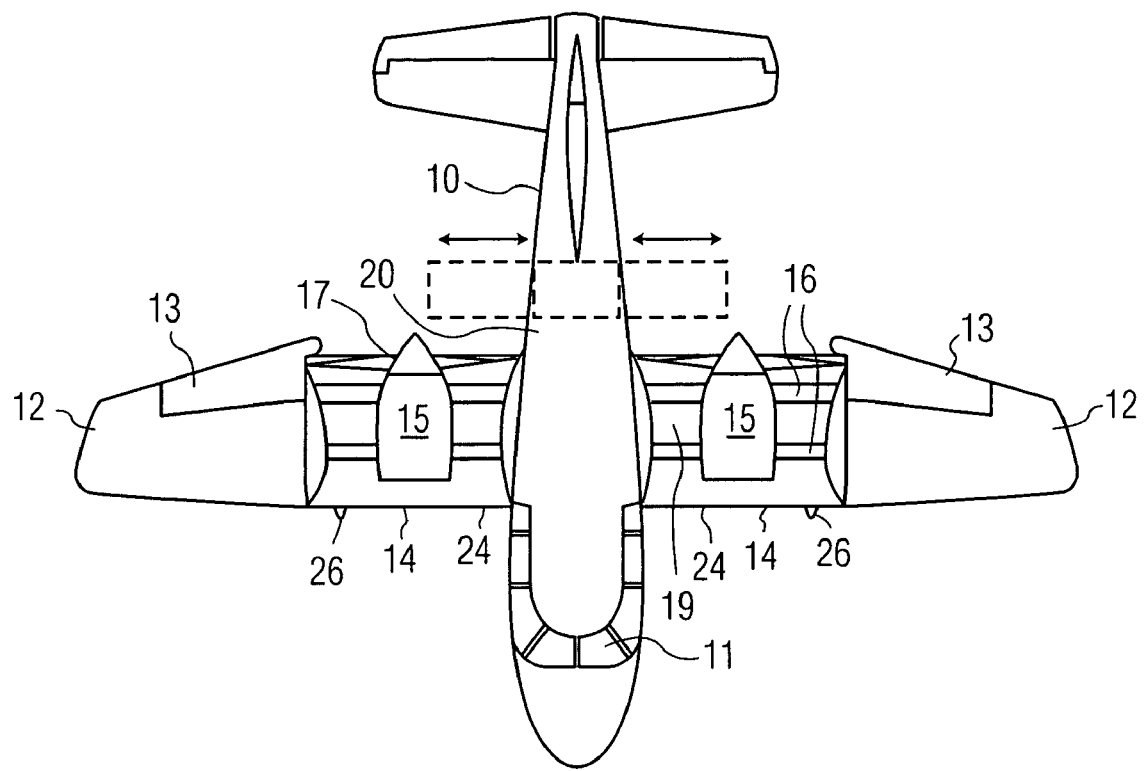
FIG. 10 is a top view of the aircraft of FIGS. 1-3 illustrating how a deflector of the type shown in FIGS. 7-9 may be moved into and out of the fuselage of the aircraft.

FIG. 10 shows the aircraft of FIGS. 1-3 in top view. As indicated in dashed lines, a deflector panel of the type shown in FIGS. 7, 8 or 9 may be extended into the active position or retracted, as desired, outwardly on either side of the aircraft or inwardly into the aircraft fuselage.

Figure 11:
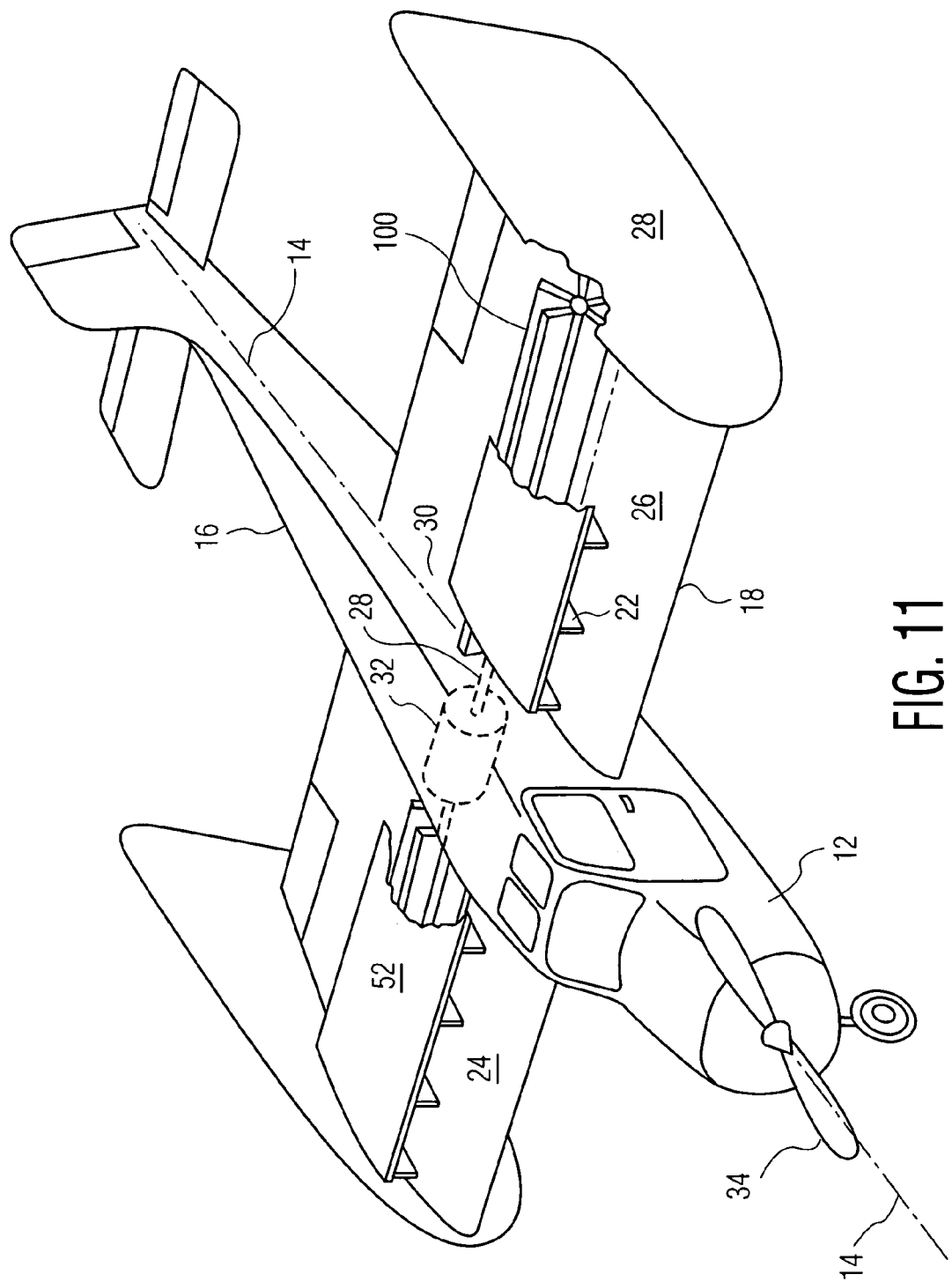
FIG. 11 is a perspective, partially cutaway view of an aircraft of the type disclosed in the aforementioned U.S. patent application Ser. No. 11/229,157.

The VTOL Personal Aircraft illustrated in FIG. 11 is more fully disclosed in my co-pending patent application Ser. No. 11/229,157. In this aircraft, the means for increasing the speed of the airstream flowing over the upper surface of each wing comprises a plurality of fan blades 30 mounted on and affixed to a rotatable shaft 28 that extends substantially perpendicular to the central longitudinal axis 14 of the aircraft. The shaft 28 on each side of the aircraft is driven by a common prime mover 32 which may, for example, comprise an internal combustion engine of the type known as a "barrel engine". Such an engine is disclosed in various U.S. patents of Karl L. Herrmann, among other inventors. See, for example, U.S. Pat. No. 3,016,110.

Preferably, the transverse fans, so described, are covered by guide members or shrouds 52, disposed substantially parallel to the upper surface of each respective wing and adjacent to the fan blades, for restricting the airstream to flow in a direction substantially parallel to the upper surface of the wing.

Figure 12:
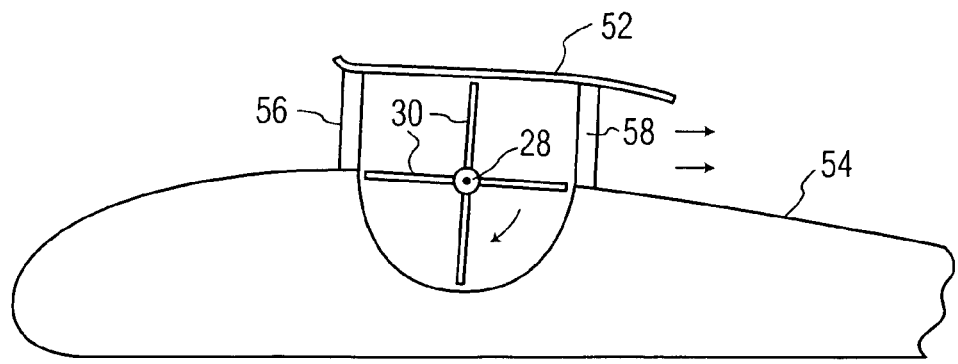
FIG. 12 is a representational, detailed diagram illustrating the device for increasing the speed of the air flowing over the upper surface of each wing in the aircraft of FIG. 11.

FIG. 12 illustrates the fan blades in side view. In this diagram the blades are indicated by the reference numeral 30 while the shaft and shroud are again designated 28 and 52, respectively. The shroud 52 is supported at its leading and trailing edges by vertical fins 56 and 58, respectively, which also serve to maintain an even, horizontal flow of air, as indicated by the arrows, over the upper surface 54 of the wing.

The speed of the air S driven by the fan blades 100 may be calculated using the following formula:

$$\frac{R\frac{\text{Rev.}}{\text{Min.}} \times 60\frac{\text{Min.}}{\text{Hr.}} \times \pi D\frac{\text{Ft.}}{\text{Min.}}}{5280\frac{\text{Ft.}}{\text{Min.}}} = S\frac{\text{Miles}}{\text{Hr.}}$$

As may be seen, when the shafts 28 are rotated at a speed R of 5280 RPM, and the fans have a diameter D of two feet, the air will be driven over the upper surface of the wing at a speed S of 377 MPH.

Figure 13A:
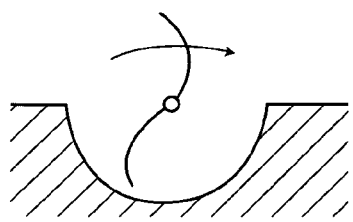
FIGS. 13A-13H are representational diagrams showing various similar configurations of devices for increasing the speed of the air flowing over the upper surface of a wing.
Figure 13B:

FIGS. 13a-13h illustrate various embodiments, identical or similar to the embodiment shown in FIG. 12, of a device for accelerating the air flow over the upper surface of an aircraft wing. FIGS. 13a and 13b illustrate the basic structure wherein a plurality of blades 30 are rotated by a shaft 28 which is transverse to the longitudinal central axis 14 of the aircraft. As may be seen, the blades 30 have an "S" shape in cross-section; however, they may be configured in any shape which is appropriate for the desired purpose. In the embodiments of FIGS. 13a and 13b there is no shroud 52. Such a shroud is provided in the embodiment of FIG. 13c.

Figure 13C:
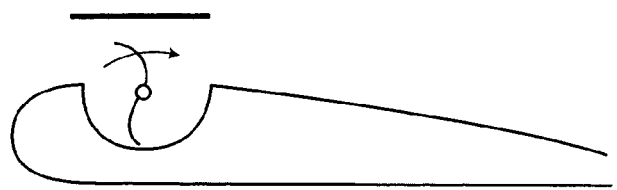
Figure 13D:
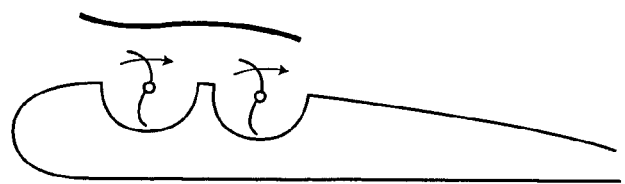
Figure 13E:
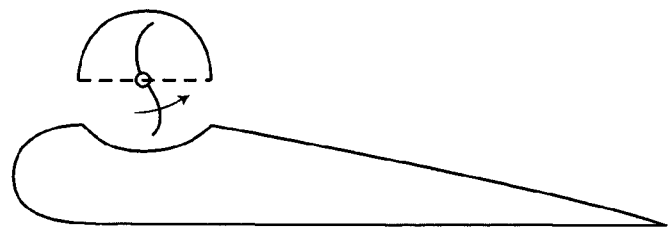

In the embodiment of FIG. 13d, two transverse shafts are provided to rotate two sets of blades, arranged in tandem, beneath a single shroud. These shafts rotate in the same direction (clockwise in the illustration of FIG. 13d) to accelerate the air from the leading edge toward the trailing edge of the wing.

In the embodiments of FIGS. 13e-13h, one or more shafts with the respective sets of blades, are arranged immediately above the upper surface of the wing. The shaft or shafts in this case is/are arranged in a shroud immediately above the upper surface of the wing and rotate counterclockwise to drive the air rearward from the leading edge toward the trailing edge of the wing.

Figure 13F:
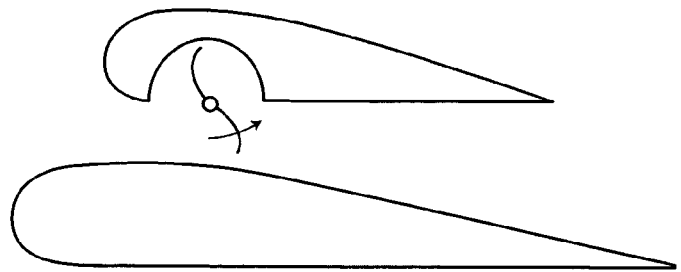
Figure 13G:
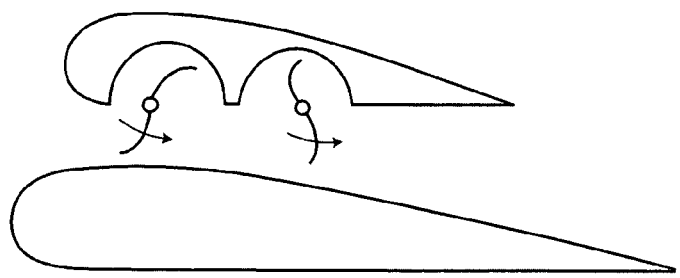
Figure 13H:
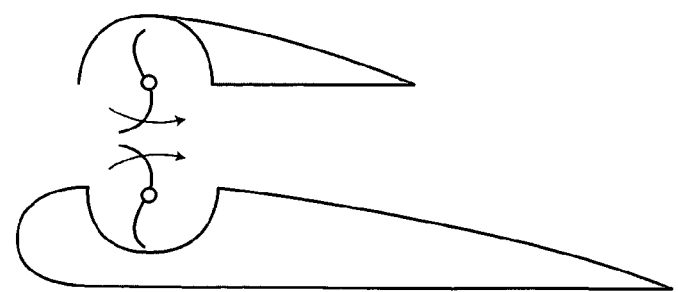

FIG. 13h shows still another embodiment in which two transverse shafts, with their respective fan blades, are provided one above, and one substantially in line with, the upper surface of the wing.

Figure 14:
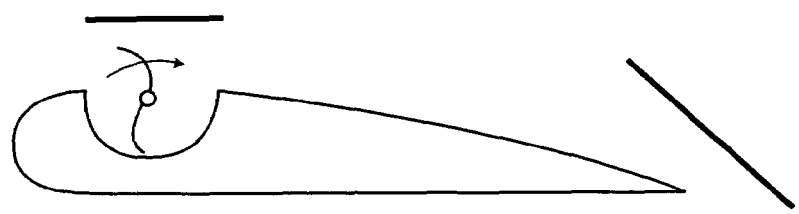
FIGS. 14, 15 and 16 are representational diagrams showing (1) an aircraft wing with means for increasing the speed of the air flowing over the upper surface of the wing, and (2) the three preferred embodiments, respectively, of an air deflector arranged to deflect downward the airstream flowing over the upper surface of the wing.
Figure 15:
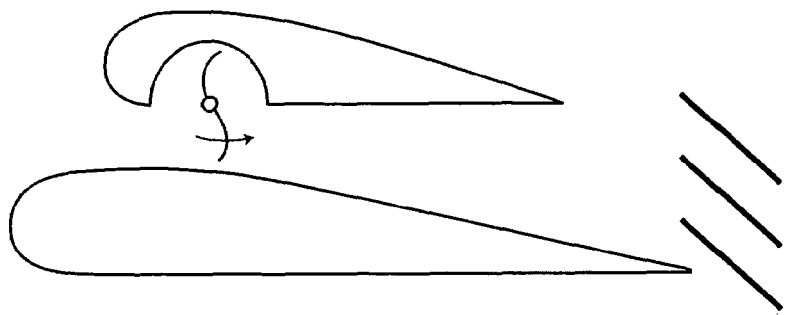
Figure 16:
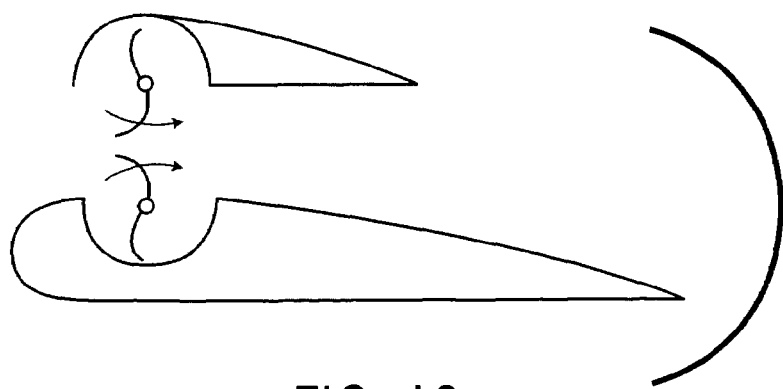

FIGS. 14, 15 and 16 illustrate the three embodiments of FIGS. 13c, 13f and 13h, respectively, each provided with an air deflector disposed on each side of the fuselage between the rear edge of each wing and the aircraft tail so as to deflect downward the airstream flowing over the upper surface of the wing.

The preferred embodiment of the air deflector in FIG. 14 is similar to that in FIG. 7; the preferred embodiment in FIG. 15 is similar to that in FIG. 9, and the preferred embodiment in FIG. 16 is similar to that in FIG. 8.

In summary, the present invention concerns a vertical take-off and landing aircraft having a central fuselage with a tail at its rear end and a wing on each side. Means, such as the propeller in the Custer Channel Wing aircraft of FIGS. 1-3 and the transverse shaft 28 with blades 30 in the aircraft of FIGS. 11-13, are provided for increasing the speed of the airstream flowing over the upper surface of the wing.

Finally, an air deflector is disposed on each side of the fuselage between the trailing edge of each wing and the aircraft tail for deflecting downward the airstream flowing over the upper surface of each wing.

There has thus been shown and described a novel VTOL personal aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A vertical take-off and landing (VTOL) aircraft comprising, in combination:
    (a) a fuselage having a front end, a rear end and two lateral sides, said fuselage defining a substantially horizontal central longitudinal axis of the aircraft;
    (b) an aircraft tail arranged at the rear end of the fuselage and including a rudder and an elevator on each side of the fuselage, said rudder and elevator having movable surfaces for control of the aircraft;
    (c) a wing on each side of the fuselage, each wing having a front edge, a rear edge and an upper surface extending from the front edge to the rear edge thereof;
    (d) means for increasing the speed of an airstream flowing over the upper surface of each wing; and
    (e) an air deflector disposed on each side of the fuselage between the rear edge of each wing and the aircraft tail and having a deflection surface to deflect the airstream flowing over the upper surface of the wing in both a downward and a forward direction.

2. The aircraft defined in claim 1, wherein the deflection surface has a shape selected from the group consisting of substantially planar and curved in a horizontal arc.

3. The aircraft defined in claim 1, wherein the deflector has a curved surface for deflecting the airstream.

4. A vertical take-off and landing (VTOL) aircraft comprising, in combination:
    (a) a fuselage having a front end, a rear end and two lateral sides, said fuselage defining a substantially horizontal central longitudinal axis of the aircraft;
    (b) an aircraft tail arranged at the rear end of the fuselage and including a rudder and an elevator on each side of the fuselage, said rudder and elevator having movable surfaces for control of the aircraft;
    (c) a wing on each side of the fuselage, each wing having a front edge, a rear edge and an upper surface extending from the front edge to the rear edge thereof;
    (d) means for increasing the speed of an airstream flowing over the upper surface of each wing; and
    (e) an air deflector disposed on each side of the fuselage between the rear edge of each wing and the aircraft tail and having a deflection surface to deflect downward the airstream flowing over the upper surface of the wing,
    wherein said deflector is retractable into and out of the fuselage, said deflector being movable between a first position within the fuselage and a second position within the airstream.

5. A vertical take-off and landing (VTOL) aircraft comprising, in combination:
    (a) a fuselage having a front end, a rear end and two lateral sides, said fuselage defining a substantially horizontal central longitudinal axis of the aircraft;
    (b) an aircraft tail arranged at the rear end of the fuselage and including a rudder and an elevator on each side of the fuselage, said rudder and elevator having movable surfaces for control of the aircraft;
    (c) a wing on each side of the fuselage, each wing having a front edge, a rear edge and an upper surface extending from the front edge to the rear edge thereof;
    (d) means for increasing the speed of an airstream flowing over the upper surface of each wing; and
    (e) an air deflector disposed on each side of the fuselage between the rear edge of each wing and the aircraft tail and having a deflection surface to deflect downward the airstream flowing over the upper surface of the wing,
    wherein said deflection surface is rotatable about an axis perpendicular to said central longitudinal axis, said deflection surface being rotatable between a first position in which said airstream is minimally deflected and a second position in which the airstream is maximally deflected; and
    wherein said deflection surface is arranged substantially parallel to the central longitudinal axis when in the first position.

6. The aircraft defined in claim 5, wherein said deflection surface is arranged at a substantial angle to the central longitudinal axis when in the second position.

7. A vertical take-off and landing (VTOL) aircraft comprising, in combination:
    (a) a fuselage having a front end, a rear end and two lateral sides, said fuselage defining a substantially horizontal central longitudinal axis of the aircraft;
    (b) an aircraft tail arranged at the rear end of the fuselage and including a rudder and an elevator on each side of the fuselage, said rudder and elevator having movable surfaces for control of the aircraft;
    (c) a wing on each side of the fuselage, each wing having a front edge, a rear edge and an upper surface extending from the front edge to the rear edge thereof;
    (d) means for increasing the speed of an airstream flowing over the upper surface of each wing; and
    (e) an air deflector disposed on each side of the fuselage between the rear edge of each wing and the aircraft tail and having a deflection surface to deflect downward the airstream flowing over the upper surface of the wing,
    wherein each wing has a channel extending from the front edge to the rear edge thereof and defining a channel axis aligned substantially in parallel with said central longitudinal axis of the aircraft, and wherein said means for increasing the speed of the airstream flowing over said upper surface of each wing comprises a propeller arranged to rotate in a plane substantially perpendicular to said central longitudinal axis and about an axis substantially parallel to the channel axis of its associated wing, the plane of rotation of each propeller being substantially adjacent to the rear edge of the wing and the respective channel of its associated wing.

8. A vertical take-off and landing (VTOL) aircraft comprising, in combination:
    (a) a fuselage having a front end, a rear end and two lateral sides, said fuselage defining a substantially horizontal central longitudinal axis of the aircraft;
    (b) an aircraft tail arranged at the rear end of the fuselage and including a rudder and an elevator on each side of the fuselage, said rudder and elevator having movable surfaces for control of the aircraft;
    (c) a wing on each side of the fuselage, each wing having a front edge, a rear edge and an upper surface extending from the front edge to the rear edge thereof;

(d) means for increasing the speed of an airstream flowing over the upper surface of each wing; and (e) an air deflector disposed on each side of the fuselage between the rear edge of each wing and the aircraft tail and having a deflection surface to deflect downward the airstream flowing over the upper surface of the wing, wherein said means for increasing the speed of the airstream flowing over the upper surface of each wing comprises a plurality of fan blades mounted on and affixed to rotatable shaft that extends substantially perpendicular to the central longitudinal axis.

9. The aircraft defined in claim 8, wherein said means for increasing the speed of the airstream flowing over the upper surface of each wing further comprises a guide member, disposed substantially parallel to said upper surface and adjacent the fan blades, for restricting the airstream to flow in a direction substantially parallel to said upper surface.

10. The aircraft defined in claim 8, wherein each rotatable shaft is disposed within its associated wing.

11. The aircraft defined in claim 8, wherein each shaft and its associated fan blades are rotated by at least one prime mover arranged in the fuselage.

12. The aircraft defined in claim 8, wherein each rotatable shaft is disposed above the upper surface of its associated wing.

13. The aircraft defined in claim 12, wherein each rotatable shaft and its associated fan blades are disposed, in part, in a shroud which covers the blades as they move in the forward direction of the aircraft.

* * * * *